United States Patent [19]

Boutni et al.

[11] Patent Number: 4,885,336

[45] Date of Patent: Dec. 5, 1989

[54] LOW GLOSS POLYCARBONATE BLEND

[75] Inventors: Omar M. Boutni, Mt. Vernon, Ind.; Charles F. Pratt, Bergen Op Zoom, Netherlands

[73] Assignee: General Electric Company, Mt. Vernon, Ind.

[21] Appl. No.: 289,932

[22] Filed: Dec. 27, 1988

[51] Int. Cl.$^4$ .............................................. C08L 69/00
[52] U.S. Cl. ....................................... 525/67; 525/286
[58] Field of Search .................. 525/67, 148, 286, 439

[56] References Cited

U.S. PATENT DOCUMENTS 4,740,555 4/1988 Dean et al. ............................ 525/67

FOREIGN PATENT DOCUMENTS 8805452 7/1988 World Int. Prop. O. .

Primary Examiner—Theodore E. Pertilla
Attorney, Agent, or Firm—Martin B. Barancik

[57] ABSTRACT

Blends of aromatic carbonate polymers with glycidyl methacrylate grafts on ethylene-propylene-diene modified elastomer (EPDM) further modified by reaction with an epoxy acrylate have low glass as well as improved impact strength and strong weldlines.

9 Claims, No Drawings

LOW GLOSS POLYCARBONATE BLEND

BACKGROUND OF THE INVENTION

1. Field of the Invention

The invention is directed to low gloss blends of aromatic carbonate polymers with graft polymer additives based on EPDM rubber.

2. Brief Description of the Prior Art

Aromatic carbonate polymers, such as polycarbonates, have become major commercial thermoplastics in view of their excellent physical properties. While the impact strength is good in comparison with many other plastics, it can be further improved by addition of impact modifying resins.

Polycarbonates as well as such blends with impact modifiers tend to have high gloss characteristics. For some purposes, this is desirable. However, a matte or non-glossy surface is often preferable for products such as housings for computer terminals, typewriters, miscellaneous electrical appliances and certain automotive parts. There is substantial commercial need for molding resin compositions which are non-glossy.

Elimination of gloss by surface embossing has been practiced but requires a separate step and adds cost. Moreover, subsequent abrasion may remove the embossed matte surface and cause the gloss to reappear.

The addition of a delustering agent such as finely-divided silica, silicate, alumina, or other mineral filler has a seriously detrimental effect on the physical properties of the molded article such as impact strength. Attempts to add a polymeric delustering agent frequently also have deleterious effects on physical properties, not only impact strength but also on weldline strength, heat distortion temperature, and other important properties. This is not surprising, because the low gloss property arises from formation of domains or phases of optical dimensions, and the requirements for the separation of the components to form such phases tends to work against optimal strength properties and in the extreme can even cause delamination and weak weldlines. The weldlines, also known as knit lines are the surfaces of juncture between the flows coming in from different gates; ideally, these should not be weak places in molded articles using multi-gate (such as double gate) molds.

The applications for which low gloss is desired happen to be mostly ones which also demand good strength properties including strong weldlines. The present invention provides means for achieving low gloss with good impact and strong weldlines in impact modified polycarbonate blends.

DETAILED DISCUSSION OF THE INVENTION

The compositions of the invention comprise blends of:
(a) an aromatic carbonate polymer (preferably a polycarbonate); and
(b) a gloss-reducing amount of an additive polymer which is a glycidyl methacrylate graft on ethylene-propylene diene modified (EPDM) rubber further coreacted with an acrylate macromonomer.

In addition to the surprisingly low gloss, these compositions have excellent impact strength, strong weldlines, and adequately-high heat distortion temperature.

Preferred quantities are from about 80 to 99% (all percentages are by weight) of the aromatic carbonate polymer (a), and from about 1 to 20% of the additive polymer (b).

The aromatic carbonate polymers useful as component (a) include polycarbonates as well as polyestercarbonates. The method of preparation of polycarbonates by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the suitable processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction typically proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

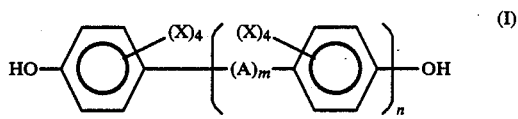
(I)

wherein A is a divalent hydrocarbon radical containing from 1 to about 15 carbon atoms; a substituted divalent hydrocarbon radical containing from 1 to about 15 carbon atoms and substituent groups such as halogen; —S—; —S—S—; —S(=O)—; —S(=O)$_2$—; —O—: or —C(=O )—; wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed in the practice of the present invention are bis-phenols such as (4-hydroxyphenyl)methane, 2,2-bis(4-hydroxyphenyl)propane (also known as bisphenol-A), 2,2bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'dihydroxydiphenyl; dihydroxyaryl sulfones such as bis(4hydroxyphenyl) sulfone, bis(3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5dichlorobenzene, 1,4-dihydroxy-3-methylbenzene; and dihydroxydiphenyl sulfides and sulfoxides such as bis(4hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bis-chloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. Particularly suitable polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

The aromatic carbonate polymers suitable for use as component (a) of the compositions of the invention include polyester-carbonates, also known as copolyesterpolycarbonates, i.e., resins which contain, in addition to recurring polycarbonate chain units of the formula:

$$-[-O-D-O-C(=O)-]-\qquad\text{(IIa)}$$

wherein D is a divalent aromatic radical of the dihydric phenol employed in the polymerization reaction, repeating or recurring carboxylate units, for example of the formula:

$$-[-O-C(=O)-R^1-C(=O)-O-D-]-\qquad\text{(IIb)}$$

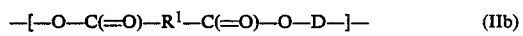

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent. In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH\qquad\text{(III)}$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

$$-E-$$

wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are suitable. Thus, in such aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

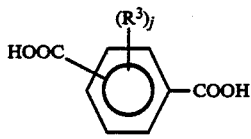 (IV)

wherein j is a positive whole integer having a value of from 0 to 4 inclusive; and each $R^3$ is independently selected from the group consisting of alkyl radicals, preferably lower alkyl (1 to about 6 C atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes most convenient, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of about 0.3 to about 1.5 deciliters per gram in methylene chloride at 25°.

In regard to component (b) the macromonomer (meth)acrylate grafts on ethylene-propylene-diene modified elastomer (EPDM) reacted with an epoxy acrylate oligomer may be prepared from any of the well known EPDM terpolymer rubbers. EPDM terpolymers useful for preparing the grafted materials used in the invention are commercially available, e.g. Copolymer Corp. EPSYN 55 or they may be prepared using a Ziegler-type catalyst. The preparation of typical EPDM terpolymers is described, for example, in Gresham et al., U.S. Pat. Nos. 2,933,480; Tarney, 3,000,866; Guglielmino et al., 3,407,158; Gladding, 3,093,621 and 3,379,701. These terpolymers are characterized by the absence of chain or backbone unsaturation and the presence of sites of unsaturation in groups which are pendant to or are in cyclic structures outside of the main polymer chain.

Useful EPDM terpolymers for the production of the glycidyl acrylate grafted terpolymers used to make the additive polymer (b) in this invention comprise ethylene, a C3 to C16 straight or branched chain alphaolefin, preferably propylene, and a non-conjugated diolefin. Satisfactory nonconjugated dienes that may be used as the third monomer in the terpolymer include straight chain dienes such as 1,4-hexadiene, cyclic dienes such as cyclooctadiene-1,5, and bridged cyclic dienes such as ethylidenenorbornene.

Representative EPDM terpolymers within the broad range of those useful in the present invention are comprised of about 1-95, preferably 45-70 mole percent ethylene, about 5 to 90, preferably 30-55 mole percent propylene and a minor amount of diene monomer, more preferably a polyunsaturated bridged ring hydrocarbon or halogenated derivative thereof, and most preferably 5-ethylidene-2-norbornene. Representative EPDM terpolymers of this type typically have a melt viscosity of approximately 78 and a gram molecular weight of about 21,600.

It is advantageous in making the EPDM graft polymer for use in the present invention that the gel content of the EPDM be controlled either during its manufacture by polymerization or in subsequent processing to achieve a value of greater than about 10% by weight and less than 80%, in order to achieve good efficacy in gloss reduction, weldline strength and good miscibility all at the same time. Gel content in an especially convenient analysis, according to ASTM D-3616, is measured by the weight percent of remaining elastomeric material after extraction in hexane or toluene. Gel content is an indication of the degree of crosslinking in the elastomeric material. Of course, persons skilled in the art are familiar with a variety of ways to control the degree of crosslinking and thus the gel content can be determined by numerous other methods. The crosslinking reaction may be a direct rubber backbone to rubber backbone joining, an epoxy functionality to epoxy functionality or rubber backone joining, or a graft chain free radical addition to a second graft chain or to a rubber backbone. Further, crosslinking may be achieved by the addition of a crosslinking agent to effectively achieve any of the above reactions. Thus, any of several steps to control gel content may be taken. Thermal aging will increase gel content, and increasing the amount of polyene monomer in the rubber will also increase gel content.

The backbone EPDM rubber is subsequently modified to make the additive polymer (b) for use in the present invention by grafting onto it at least one epoxy-functional (meth)acrylate monomer and then subsequently further reacting this grafted polymer with an acrylic macromonomer. By macromonomer is meant a monomer which consists of an oligomeric chain on the end of which is a reactive vinyl monomer group. Oligomeric is meant to include chains of from about 3 up to about 100 repeating units such as polymer units derived from addition polymerization of a vinyl monomer such as styrene, or alkyleneoxy units derived from addition polymerization of an epoxide such as propylene oxide or ethylene oxide. A acrylic macromonomer is a macromonomer as defined, on which the reactive vinyl group is an acrylate or methacrylate ester group. Such macromonomer (meth)acrylates are commercially available from Sartomer Corp., under the trademark Macromers, some bearing the trademark Chemlinks, and some as described in U.S. Pat. 3,786,116 which is incorporated herein by reference.

Although at either grafting step, grafting may occur by various reaction mechanisms at practically any point on the backbone of the EPDM rubber, generally, the grafting takes place at an unreacted point of unsaturation on the polyene. For this reason, it is suitable to make use of an ethylene, mono-olefin, polyene backbone rubber having at least two unsaturated carbon-to-carbon linkages per 100 carbon atoms and little additional benefit is derived from the use of unsaturated backbone rubber having more than 20 carbon-to-carbon double bonds per 1000 carbon atoms. In a representative embodiment of this invention, use is made of an unsaturated rubber having from 4 to 10 carbon-to-carbon double bonds per 1000 carbon atoms. A free radical initiator, such as a dialkyl peroxide at about 0.01 to 5% may be used to promote the graft reaction. In the second grafting step, where the monomer is an essentially nonvolatile acrylic macromonomer, the use of an initiator is helpful in speeding up the grafting reaction but not necessary if grafting is carried out under high temperature and high shear in an extruder. Under the latter conditions, enough radicals are generated by mechanical action to initiate grafting.

For the best efficiency of mixing of additive polymer (b) with the aromatic carbonate polymer (a), the gel content of the elastomeric material used in this invention advantageously is no higher than about 80%.

The grafting reactions may be carried out in solvent solution with the unsaturated rubber backbone present in a concentration which may range from 10–30 percent by weight, with constant stirring, at an elevated temperature within the range of 125–200 deg. C. for a time ranging from ½ to 2 hours. The reaction conditions can be varied depending somewhat upon the type and amount of catalyst and temperature conditions, as is well known to those skilled in the art. In the second grafting step where graft macromonomer is to be attached to the backbone rubber, it has been found advantageous to carry out the graft reaction in the melt state of the backbone rubber, i.e. extruder grafting. This process is simply performed by feeding the backbone rubber, an excess of the acrylic macromonomer, and if desired, an appropriate catalyst to a melt extruder and mixing and reacting the feed components at an elevated temperature.

In representative compositions for use in the present invention, the particle size of the EPDM rubber used as starting material for the grafting steps is selected to provide a substantial proportion of particles of above about 1–2 microns in size.

Further details on the preparation of suitable EPDM and certain grafting reactions thereof are given by Pratt in PCT published application WO No. 88/055452 published on July 28, 1988 and corresponding to U.S. application Ser. No. 004,089 filed Jan. 16, 1987 and now abandoned, which is incorporated by reference.

A representative exemplification of the acrylic macromonomer for use in making additive polymer (b) is a product of Sartomer Corp. offered commercially under the tradename Chemlink 4500 Macromer. It is a 13,000 molecular weight polystyrene having a methacrylate ester group at the end of the chain. Another exemplification of this macromonomer class is Chemlink 3000, (Sartomer Corp), an epoxyacrylate oligomer believed to have a short polyoxyalkylene oligomer chain on the end of which is an acrylate ester group. It is a viscous liquid reported by the manufacturer to have a molecular weight of 428 and a specific gravity of 1.20 at 25° C.

The result of grafting the macromonomer onto the EPDM is that a suitable additive polymer (b) is thus produced which is compatible with the aromatic carbonate polymer (a) such that the blends of the invention exhibit good impact and weldline strength, at the same time as low gloss.

A preferred product for use as component (b) is a composition which comprises a low gel EPDM grafted with the macromer designated as Chemlink 3000 (Sartomer Corp.), as characterized above. A particularly suitable EPDM used for this product is Epsyn 55, believed to be an approximately 55/45 (molar ratio) ethylene/propylene copolymer with about 8% ethylidenenorbornene as the diene termonomer. The reaction of the Chemlink 3000 with the EPDM is conducted by mixing these two materials in an extruder to bring about a reaction (initiated by the heat and shear of the extruder mixing which is believed to generate radical sites on the polymer, this process being sometimes designated as "reactive extrusion") and then extruding the mixture, advantageously twice.

The blends of the invention may be further modified by the addition of other types of additives known to the art of plastics compounding. Such additives can include fillers (such as clay or talc), reinforcing agents (such as glass fibers), impact modifiers, other resins, plasticizers, flow promoters and other processing aids, stabilizers, colorants, mold release agents, flame retardants, ultraviolet screening agents, and the like.

The production of the compositions of the invention by blending components (a) and (b) by any of the blending means known for the blending of thermoplastics, such as blending in a kneading machine such as a Banbury mixer, Werner Pfleiderer blender, or in an extruder, or by means of a roll mill. The sequence of addition is not critical but the components should be thoroughly blended together.

The compounded composition can be extruded and cut up, if so desired, into granules, pellets, and the like by standard techniques. The further processing of the compounded compositions can be carried out by conventional molding or extrusion processes well known in the art. An advantageous feature of our invention is that the use of multiple gates in molding does not cause weak weldlines in the finished article.

The invention will be better understood with reference to the following examples, which are presented for purposes of illustration rather than for limitation, and which set forth the best mode contemplated for carrying out the invention.

EXAMPLES 1 to 4

Molding compositions were made by blending the ingredients shown in the table below in a twin screw extruder at 220°–270° C. and 100–200 rpm. The blended and extruded material was then pelletized, dried and injection molded at about 240° C. to prepare test specimens. The gloss was measured by ASTM D-1003 at 60o using a Gardner gloss meter. Other physical properties were measured on injection molded samples using the following ASTM test methods: Tensile properties, D638; impact by notched Izod, D256; heat deflection temperature, D648–56.

| Example No.: | 1 | 2 | 3 | 4 |
|---|---|---|---|---|
| Composition (wt. %) | | | | |
| Polycarbonate[1] | 100 | 90 | 94 | 96 |
| EPDM-g-GMA-macromer[2] | — | 10 | 6 | 4 |
| Properties: | | | | |
| 60° gloss | >100 | 31 | 37 | 50 |
| Weldline strength,[3] ftlb. | >40 | 9.5 | 17.4 | 21.5 |
| Weldline strength, J | 54 | 12.9 | 23.5 | 29.1 |
| ⅛" N. Izod, ftlb./in. | 15 | 9.3 | 11.9 | 13.1 |
| 3.175 mm N. Izod, J/m | 801 | 497 | 635 | 700 |
| 1.4" N. Izod, ftlb./in. | 2.2 | 4.6 | 6.0 | 6.1 |
| 6.35 mm N. Izod, J/m | 117 | 246 | 320 | 326 |
| DTUL °C. @ 264 psi (1.82 MPa) | — | 125 | 124 | 132 |

Notes to table

1. Lexan 145 is the trademark of a polycarbonate manufactured by General Electric Co. from bisphenol A and phosgene.
2. This component is a low gel EPDM grafted with glycidyl methacrylate (GMA), as characterized in U.S. application Ser. No. 004,089 (filed Jan. 16, 1987 and abandoned, and corresponding PCT application No. WO 88/05452 published July 28, 1988) and then reacted with epoxy acrylate macromonomer designated as Chemlink 3000. This product is available from Copolymer Corp. under the designation Chemlink 3000/EPDM-g-GMA Adduct.
3. A test for the strength of a weldline, which is conducted by the method of ASTM D256.

Blends having low gloss characteristics are similarly obtained by substituting Chemlink 4500 (further defined hereinabove) for Chemlink 3000 as the grafting macromonomer in the composition described above.

What is claimed is:

1. A low gloss thermoplastic blend which comprises: (a) an aromatic carbonate polymer; and (b) a gloss reducing amount of a polymeric additive which is a glycidyl methacrylate graft onto ethylenepropylene diene modified (EPDM) rubber further reacted with an acrylate macromonomer.

2. A low gloss thermoplastic blend as defined in claim 1 wherein said aromatic carbonate polymer (a) is a polycarbonate.

3. A low gloss thermoplastic blend as defined in claim 1 wherein said polymeric additive (b) is derived from the reaction of an epoxy acrylate macromonomer with a glycidyl methacrylate-grafted EPDM elastomer by mixing and coreacting in an extruder.

4. A low gloss thermoplastic blend as defined in claim 1 wherein said aromatic carbonate polymer (a) is a polycarbonate and said polymeric additive (b) is derived from the reaction of an epoxy acrylate oligomer with a glycidyl methacrylate-grafted EPDM elastomer.

5. A low gloss thermoplastic blend as defined in claim 1 wherein said aromatic carbonate polymer (a) is present at from about 80 to about 99% by weight, and said polymeric additive (b) is present at about 1 to 20% by weight.

6. A low gloss thermoplastic blend as defined in claim 2 in which (a) is a polycarbonate derived from bisphenol A and phosgene.

7. A low gloss thermoplastic blend as defined in claim 6 in which said polymeric additive (b) is the reaction product from a low gel EPDM grafted with glycidyl methacrylate and reacted with an epoxy acrylate oligomer by mixing and reacting in an extruder.

8. A low gloss polycarbonate blend as defined in claim 7 in which said low gel EPDM is an approximately 55/45 ethylene/propylene copolymer with about 8% ethylidenenorbornene as termonomer.

9. A low gloss thermoplastic blend as defined in claim 7 in which said low gel EPDM has from about 20 to about 80% gel content by weight.

* * * * *

UNITED STATES PATENT AND TRADEMARK OFFICE
CERTIFICATE OF CORRECTION

PATENT NO. : 4,885,336

DATED : December 5, 1989

INVENTOR(S) : Omar Mohamed Boutni
Charles Franklyn Pratt

It is certified that error appears in the above-identified patent and that said Letters Patent is hereby corrected as shown below:

On the first page
Line 12
Under Abstract
Delete "glass" and add "gloss"

Signed and Sealed this

Thirtieth Day of October, 1990

Attest:

HARRY F. MANBECK, JR.

Attesting Officer                Commissioner of Patents and Trademarks